United States Patent [19]

Caldwell et al.

[11] Patent Number: 4,457,392

[45] Date of Patent: Jul. 3, 1984

[54] AUTOMATIC SPEED CONTROL SYSTEMS

[75] Inventors: Kenneth B. Caldwell, Rugby; Kenneth W. Beddow, Coventry, both of England

[73] Assignee: Associated Engineering Limited, Rugby, England

[21] Appl. No.: 285,534

[22] Filed: Jul. 21, 1981

[30] Foreign Application Priority Data

Aug. 8, 1980 [GB] United Kingdom ............... 8025881

[51] Int. Cl.³ .................................... B60K 31/00
[52] U.S. Cl. ................................ 180/176; 123/360; 123/379; 180/177
[58] Field of Search ............... 180/177, 176, 175; 123/360 X, 379 X, 382, 383, 385, 386, 387

[56] References Cited

U.S. PATENT DOCUMENTS

| 2,897,906 | 8/1959 | Brueder | 123/360 |
| 3,575,256 | 2/1969 | Jania et al. | 180/105 E |
| 3,923,020 | 12/1975 | Gilligan | 180/177 |
| 3,963,091 | 6/1976 | Noddings | 180/176 |
| 4,345,663 | 8/1982 | Sheilds | 180/177 |
| 4,354,466 | 10/1982 | Dudley | 123/360 |

FOREIGN PATENT DOCUMENTS

| 2330939 | 6/1973 | Fed. Rep. of Germany . |
| 2436982 | 8/1974 | Fed. Rep. of Germany . |
| 2836342 | 11/1978 | Fed. Rep. of Germany . |
| 2020580 | 10/1969 | France . |
| 1437083 | 5/1973 | United Kingdom . |
| 1540913 | 2/1976 | United Kingdom . |
| 2009463A | 5/1978 | United Kingdom . |
| 1579506 | 11/1980 | United Kingdom . |

Primary Examiner—David M. Mitchell
Assistant Examiner—Joseph McCarthy
Attorney, Agent, or Firm—Leydig, Voit, Osann, Mayer & Holt, Ltd.

[57] ABSTRACT

Linkage is disclosed for adjusting the position of a diesel engine injection pump control rack in dependence on the position of the driver's accelerator pedal and also on a system for automatically maintaining the vehicle speed at a desired value. The injection pump rack is positioned by means of a pneumatic piston-cylinder assembly and connecting linkage. The pressure in the piston-cylinder assembly is adjusted by means of a driver-controlled valve in a supply line from a pressure source, and this valve is adjusted by the driver's accelerator pedal. A normally open valve is also connected in the pressure circuit and a normally closed exhaust valve is provided. When the automatic speed control system is in operation, the driver fully opens the driver-controlled valve (by fully depressing his foot pedal) and the automatic system adjusts the other valves to hold the speed at the desired value. When the driver releases his foot pedal, the driver-controlled valve shuts, preventing the automatic speed control having any further effect on engine power.

3 Claims, 5 Drawing Figures

FIG. I.

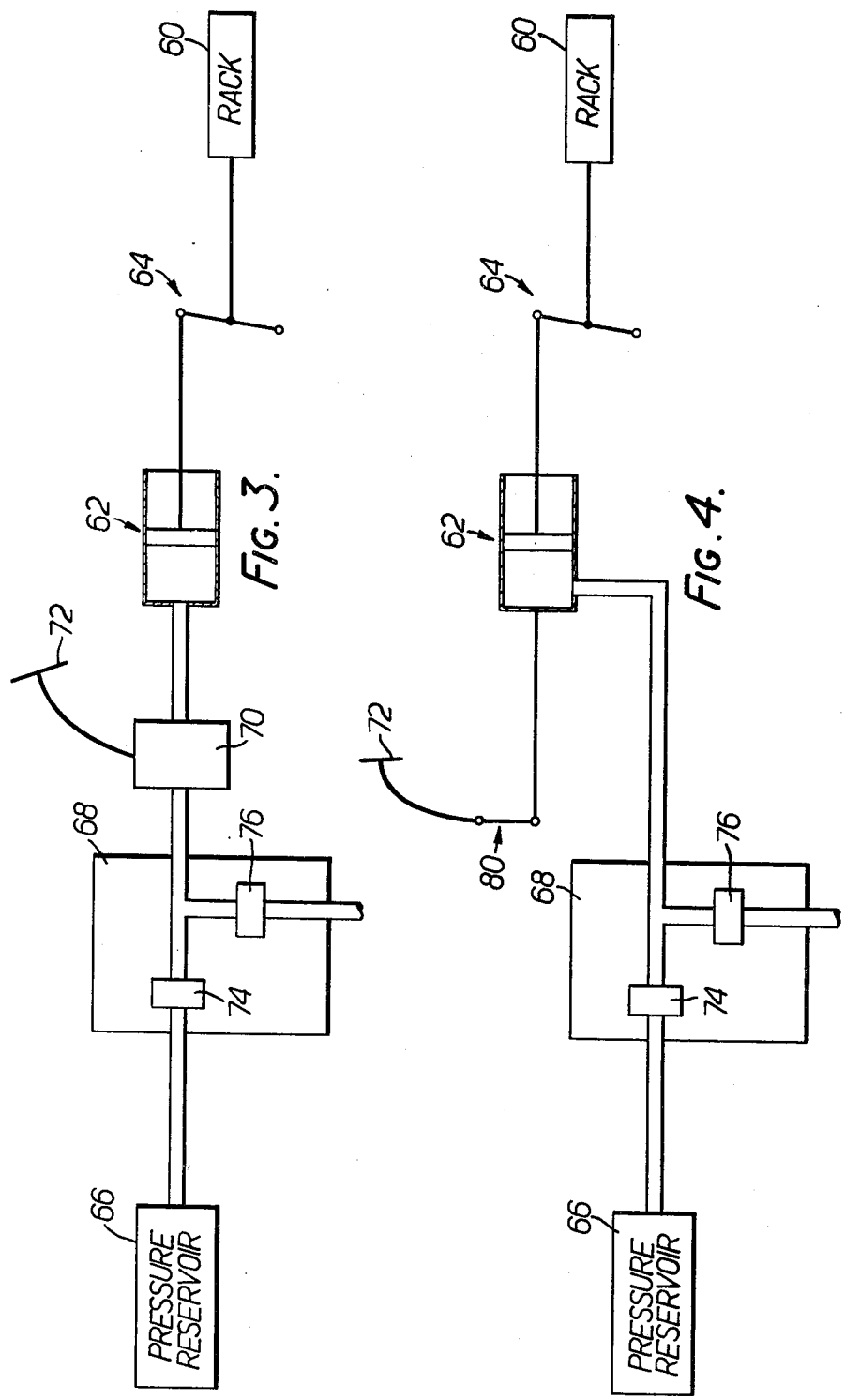

AUTOMATIC SPEED CONTROL SYSTEMS

BACKGROUND OF THE INVENTION

The invention relates to speed-responsive electrical systems and circuit arrangements and more specifically to such systems and circuit arrangements responsive to the speed of a vehicle, such as a road vehicle, and, for example, for automatically controlling the speed of the vehicle.

Vehicle speed control systems are known in which the vehicle driver selects a desired speed and the system produces an error signal depending on the difference (if any) between actual and desired speeds for the vehicle. This error signal automatically controls the engine power so as to tend to reduce the speed difference to zero.

An object of the invention is to provide an improved vehicle speed control system.

Another specific object is to provide means by which the driver can maintain overall supervision of the speed control system so as, for example to switch it out of action when not required.

A more specific object of the invention is to provide means by which the driver can maintain such supervision by means of his wheel throttle control (i.e. throttle pedal).

BRIEF SUMMARY OF THE INVENTION

According to the invention, there is provided an automatic vehicle speed control system, comprising means responsive to desired and actual vehicle speeds to produce a control signal dependent on any speed error, a member whose movement adjusts the power of the engine of the vehicle, a driver-operable engine power control, connecting means interconnecting the driver-operable control with the said member whereby to enable the driver to adjust the engine power, and control means incorporated in the said connecting means and operative to vary the engine power in dependence on the said control signal, the arrangement being such that the control means is rendered substantially unresponsive to the said control signal when the driver-operable control is in the minimum power setting.

DESCRIPTION OF THE DRAWINGS

An electrical system for automatically controlling a road vehicle to run at a set speed which may be selected by the driver, and embodying the invention, will now be described, by way of example only, with reference to the accompanying diagrammatic drawings in which:

FIG. 3 shows one form of pneumatic and mechanical linkage by means of which the system can control the enginer power of the vehicle;

FIG. 4 shows another form of the linkage, again of pneumatic and mechanical form.

DESCRIPTION OF THE PREFERRED EMBODIMENTS

Figure 1:
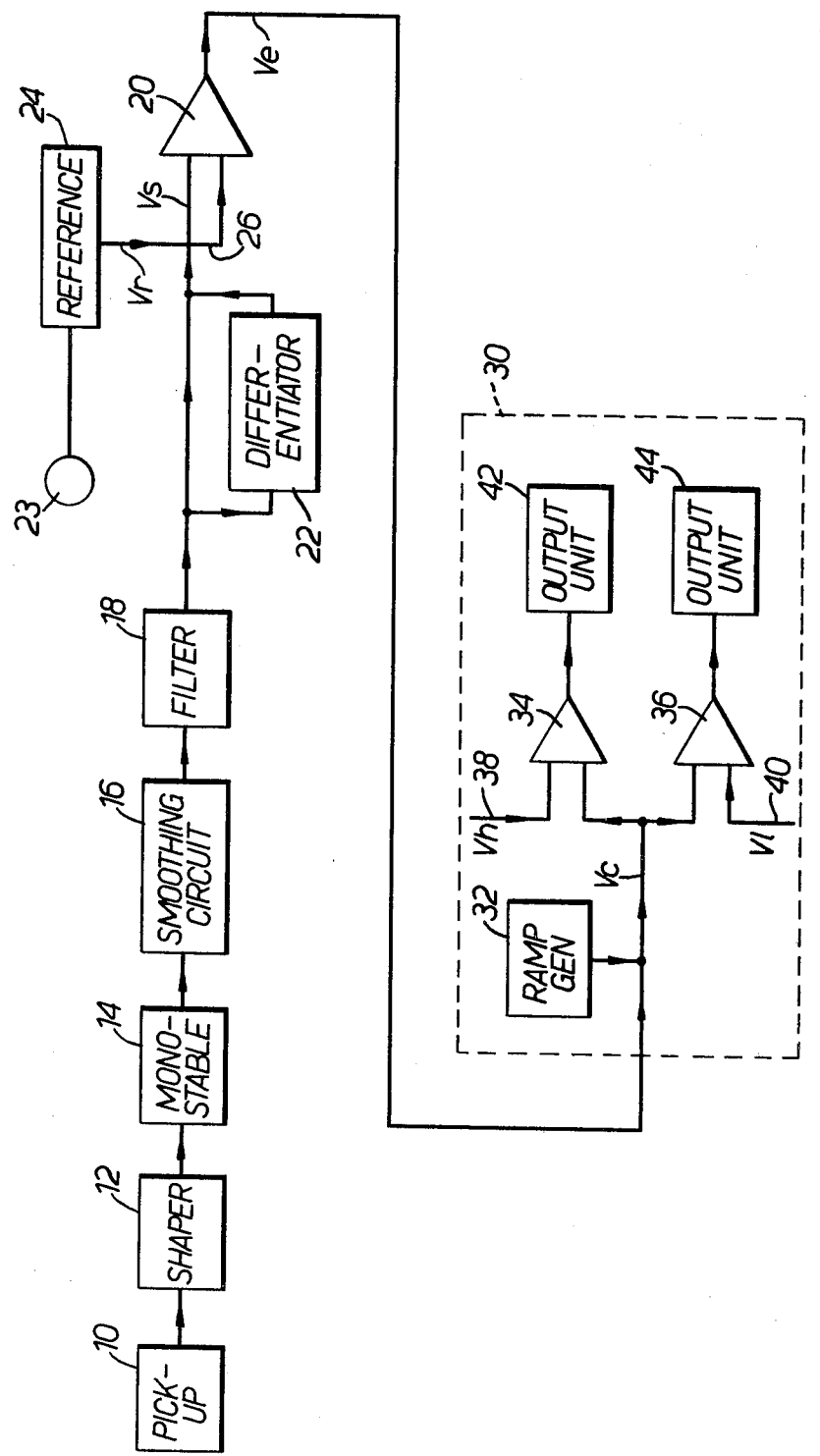
FIG. 1 is a block circuit diagram of the system.

As shown in FIG. 1, a signal representing the speed of the vehicle is derived by means of a pick-up 10 which may be in the form of a transducer, such as a magnetic transducer, sensing rotation of the propeller shaft of the vehicle. The pick-up 10 produces pulses at a frequency dependent on the road speed of the vehicle and these are shaped into a square wave in a shaping circuit 12 and used to control a monostable 14 which therefore produces constant width pulses at a frequency dependent on the road speed. A smoothing circuit 16 smoothes the pulses into a unidirectional voltage having a value which is dependent on road speed (in this example, it is arranged to be inversely dependent on road speed). A filter 18 removes most of the ripple on this voltage to produce an output signal which is fed to the first input of a comparator 20 and also to a differentiating circuit 22 which feeds the same input of the comparator. The effect of the differentiating circuit 22 is to augment the signal applied to the comparator 20 from the filter 18 when a sudden change occurs in the filter output. The purpose of this is to tend to stabilise the control system.

The signal applied to the first input of the comparator 20 is referred to below as Vs and is inversely dependent on the road speed of the vehicle.

In order to be able to select the desired road speed for the vehicle, the driver has a control 23 by means of which he can adjust a setting circuit 24 (a potential divider network, for example) to produce a desired speed signal Vr on a line 26. Signal Vr is fed to the second input of the comparator 20. The output of the comparator 20 is therefore an error signal Ve whose sign and magnitude are dependent on the sign and magnitude of the difference between the desired speed Vr and the actual speed Vs. The signal Ve is fed to an output control unit 30 to adjust the power output of the vehicle's engine in a direction and by an amount so as to bring the vehicle speed to the desired value Vr.

The output control circuit 30 may take any convenient form. In the example being considered, it comprises a ramp generator 32 generating an electrical waveform of triangular shape which ramps between fixed limits and which is added to the error signal Ve. The resultant signal Vc is fed to two comparators 34 and 36 whose second inputs receive respective fixed reference levels. The second input of the comparator 34 receives a relatively high fixed reference level Vh on a line 38 and the second input of comparator 36 receives a relatively low reference signal Vl on a line 40.

Figure 2:
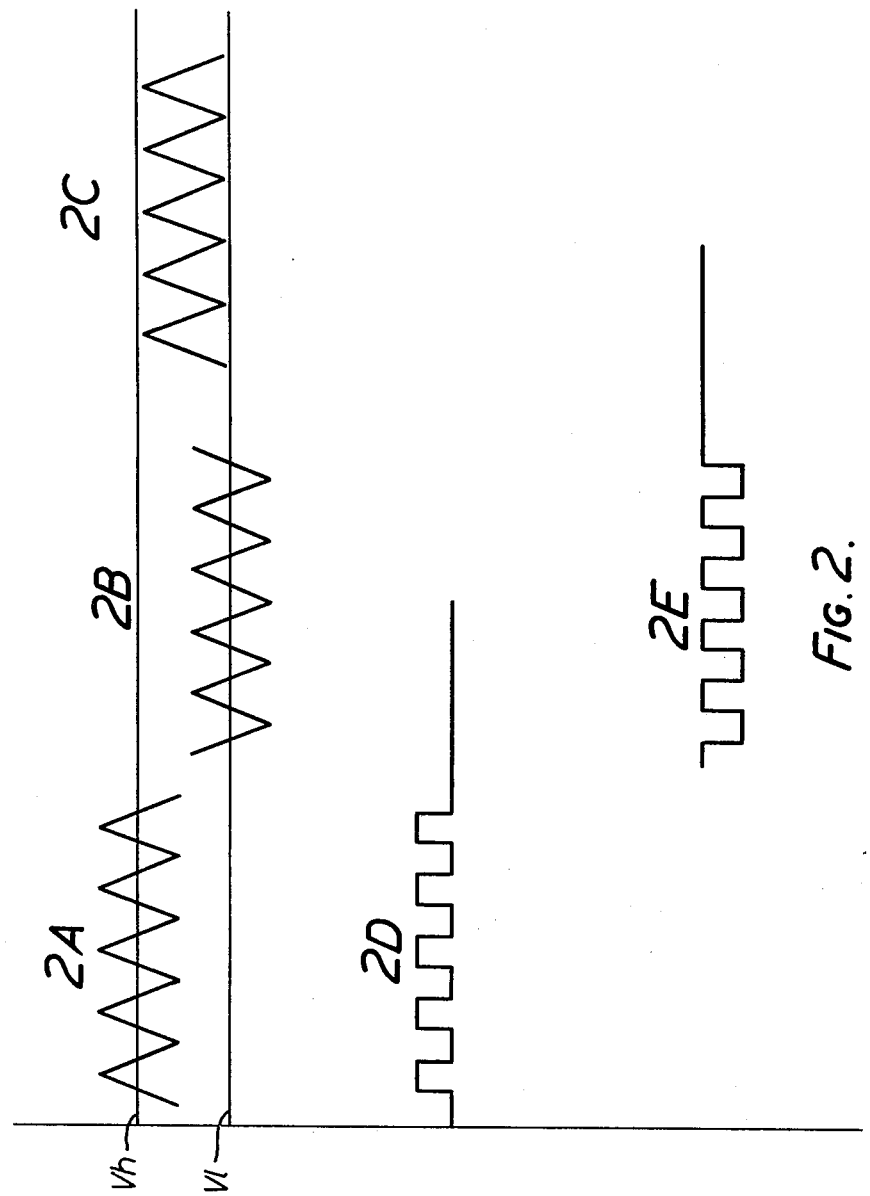
FIG. 2 shows waveforms occurring in the system.

FIG. 2 explains the operation of the comparators 34 and 36 and shows the upper and lower fixed references Vh and Vl. At FIG. 2A is shown the signal Vc in circumstances in which the vehicle speed is above the desired value, this therefore being a situation in which Ve is significantly above its datum value. As shown, the effect of this is that the peaks of Vc rise above Vh causing the comparator 34 to produce a succession of output pulses, FIG. 2D, at the ramp frequency, and these pulses drive an output unit 42 whose operation tends to decrease the output power of the vehicle engine. During this time comparator 36 produces a continuous output which holds an output unit 44 in a setting in which it does not tend to increase the engine power.

At FIG. 2B, the signal Vc is shown when the vehicle speed is below the desired value, this being a situation in which Ve is significantly below the datum value. Therefore, the troughs of Vc fall below the reference Vl and comparator 36 produces output pulses which drive output unit 44 and cause it to increase the power of the engine. Comparator 34 produces no output and output unit 42 is therefore held in a setting in which it does not tend to decrease the engine power.

At FIG. 2C, the vehicle speed is assumed to be at the correct value and the signal Vc lies wholly between the upper and lower references Vh and Vl. Therefore, comparator 34 produces no output and comparator 36 produces the continuous output mentioned above, and the engine power is maintained constant.

When there is a speed error, the mark-space ratio at which the appropriate output unit 42 or 44 (depending on whether the vehicle speed is above or below the desired speed) is operated will depend on the magnitude of the speed error.

The output units 42 and 44 can control the engine power in any suitable way such as by controlling the engine throttle, or the injection pump rack in the case of a diesel engine, by a suitable electrical, mechanical or pneumatic or other linkage.

Figure 5:
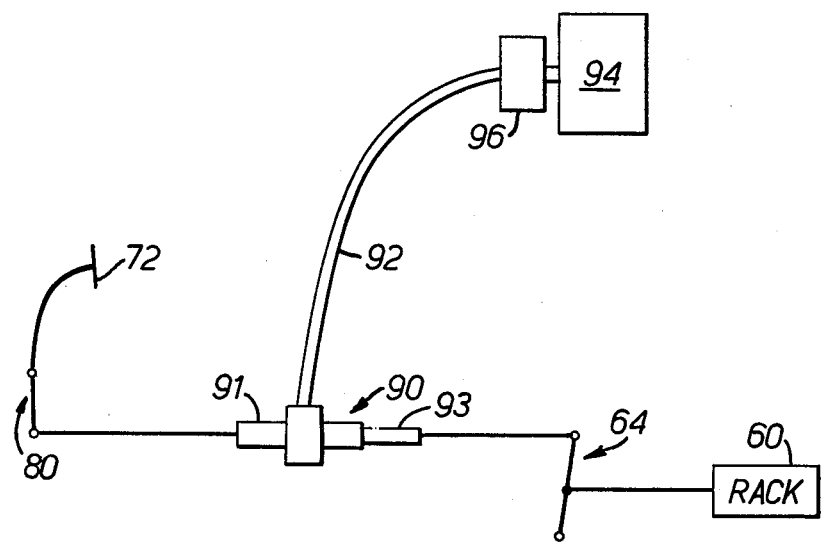
FIG. 5 shows a further form of the linkage, this time of electromechanical form.

Three possible arrangements are shown by way of example in FIGS. 3, 4 and 5, each being intended primarily for use with a diesel engine and thus controlling the output power by adjusting the position of the injection pump rack.

In the system shown in FIG. 3, the position of the injection pump rack 60 is controlled by means of a pneumatic piston-cylinder assembly 62 through the intermediary of linkage 64. Pneumatic pressure for driving the piston-cylinder 62 is supplied by a reservoir 66 which may be fed by an engine-driven pump. The pressure is applied to the cylinder of the assembly 62 through a valve unit 68 and a variable pressure valve 70 operated by the driver's normal accelerator pedal 72.

The valve unit 68 has a normally open solenoid-operated inlet valve 74 and a normally closed solenoid operated exhaust valve 76. The solenoid of the inlet valve 74 is energised under control of the output unit 44 (FIG. 1), and the solenoid of the exhaust valve 76 is energised under control of the output unit 42.

When the automatic speed control system is not in operation, the solenoids of the valves 74 and 76 are held de-energised and therefore the inlet valve 74 is held fully open and the exhaust valve 76 is held fully closed. Under these conditions, therefore, the pressure in the cylinder of the assembly 62 is controlled solely by the position of the driver's pedal 72 and he alone therefore controls the engine power and thus the speed of the vehicle.

When the driver wishes to bring the automatic speed control system into operation, he sets the desired speed by means of the control 23 (FIG. 1) so as to set the value of the signal Vr appropriately. At the same time, he fully depresses his pedal 72 (FIG. 3). Because the pedal 72 is fully depressed, the pressure in the assembly 62 is now controlled by the states of the valves 74 and 76.

If the vehicle speed is too low, then the output unit 44 will be operated by the comparator 36. If the vehicle speed is sufficiently below the desired level, the output unit 44 will continuously hold the solenoid valve 74 de-energised and the valve will be held fully open. Under these conditions, the comparator 34 will be producing no output and therefore the output unit 42 will hold de-energised the solenoid of the exhaust valve 76. Therefore, full pressure will be applied to the assembly 62 and the engine power will be at a maximum so as to bring the vehicle up towards the desired speed.

As the vehicle approaches the desired speed, the mean value of the signal Vc (FIGS. 1 and 2) will start to rise and the comparator now starts to produce a pulsed output. These pulses will have an increasing mark-space ratio as the speed increases and the solenoid of the inlet valve 74 will therefore be energised with an increasing mark-space ratio. Therefore, the supply of air to the piston-cylinder assembly 62 will be gradually shut off. This will not in itself alter the engine power, because the air pressure previously applied to the assembly 62 will be held supplied (as the exhaust valve 76 is still closed). However, as the speed continues to increase, the peaks of Vc now rise above the reference value Vh (FIG. 2A) and comparator 34 now produces a pulsed output which energises valve 76 to connect the assembly 62 to exhaust and this therefore results in a decrease in engine power to tend to hold the vehicle at the desired speed.

If the vehicle speed is too high, and well above the desired value Vr, then comparator 36 will produce its continuous output and output unit 44 will therefore hold the solenoid of the inlet valve 74 (FIG. 3) continuously energised and therefore closed. This will stop air entering the piston-cylinder assembly 62. At the same time, comparator 34 will produce an output which will cause the output unit 42 to open the exhaust valve 76 (either continuously or in a pulsed manner, depending on the magnitude of the error). Therefore, the air in the assembly 62 will leakaway and the engine power will reduce. As the vehicle speed falls, comparator 34 will close the exhaust valve 76 for proportionately longer and comparator 36 will start to produce a pulsed output which will allow air to begin to enter piston-cylinder 62 via inlet valve 74.

In this way, therefore, the output unit 30 (FIG. 1) controls the valve unit 68 (FIG. 3) in such a manner as to tend to hold the vehicle at the desired speed.

The operation of the system requires the driver to maintain the pedal 72 fully depressed. If he releases the pedal, then the valve unit 68 can no longer control the pressure in the piston-cylinder assembly 62 and the speed control system is therefore effectively put out of operation and the engine power is reduced to a minimum.

FIG. 4 shows a modified form of the system of FIG. 3, and parts in FIG. 4 corresponding to parts in FIG. 3 are correspondingly referenced.

As shown in FIG. 4, the driver's pedal 72 is now connnected directly to the cylinder of the piston-cylinder assembly 62 via a mechanical linkage 80. As before, the piston of the assembly 62 is connected to control the position of the rack 60 via linkage 64, and the pneumatic pressure in the piston-cylinder assembly 62 is controllable by the valve unit 68. When the automatic speed control system is not in operation, the inlet valve 74 is fully opened and the exhaust valve 76 is fully closed, as for the system in FIG. 3. In this situation, there is full air pressure in the piston-cylinder assembly 62 and the piston is held fully extended. In this condition, the position of the rack 60 and thus the power of the engine, are controlled solely by the position of the pedal 72 which moves the piston-cylinder assembly 62 bodily.

When the driver wishes to bring the automatic speed control system into operation, he sets the signal Vr (FIG. 1) by means of the control 23 as before, and fully depresses the pedal 72 and holds it depressed.

In the same manner as described above with reference to FIG. 3, the output units 42 and 44 of FIG. 1 now control the valves 74 and 76 so as to adjust the pressure in the piston-cylinder assembly 62 in a sense and by an amount to tende to hold the vehicle at the required speed. As before, release of the pedal 72 puts the automatic speed control system effectively out of action.

The pressure source 66 need not be a source of pneumatic pressure but can be some other pressure source, and can also be a source of negative (i.e. partial vacuum) instead of positive pressure.

FIG. 5 shows an electromechanical system and parts in FIG. 5 corresponding to parts in FIGS. 3 and 4 are correspondingly referenced.

As shown in FIG. 5, the driver's pedal 72 is connected to the linkage 64 by a mechanical link 90 so that depression of the pedal 72 pushes on the link 90 and moves the rack 60 to the right so as to increase the enginer power.

The link 90 is of adjustable length. It may for example comprise a tube 91 internally coupled to a rod 93 by means of a screw thread with the tube rotatably coupled to the linkage 80 and the rod non-rotatably coupled to the linkage 64. Therefore, rotation of the tube has the effect of changing the length of the link 90 and thus of adjusting the position of the rack 60 (and the power of the engine) even though the position of the pedal 72 is unchanged.

The link 90 is connected by a flexible drive 92 to an electric motor 94 through a gearbox 96. Rotation of the shaft of the motor 94 therefore causes the flexible drive 92 to adjust the link 90 (as by rotating the tube 91) so as to increase or decrease its effective length, depending on the direction of rotation of the motor. The motor itself is energised under control of the output units 42 and 44 (FIG. 1).

When the automatic speed control system is not in operation, the output units 42 and 44 set the electric motor 94 so that the link 90 has maximum length. In this condition, the position of the rack 60, and thus the power of the engine, are controlled solely by the position of the pedal 72. The allowable movement of the pedal 72 is such that when fully released the rack 60 is in its minimum power setting.

When the driver wishes to bring the automatic speed control system into operation, he sets the signal Vr (FIG. 1) by means of the control 23 as before, and fully depresses the pedal 72 and holds it depressed.

The output units 42 and 44 of FIG. 1 now control the motor 94 so as to adjust the length of the link 90 in a sense and by an amount to tend to hold the vehicle at the required speed. As before, release of the pedal 72 puts the automatic speed control system effectively out of action.

What is claimed is:

1. An automatic vehicle speed control system comprising
   means responsive to desired and actual vehicle speeds to produce a control signal dependent on any speed error,
   a member whose movement adjusts the power of the engine of the vehicle,
   a pneumatic pressure line,
   first, driver-operable, pneumatic-pressure-adjusting valve means in the said pressure line,
   a piston-cylinder assembly having the interior of the cylinder connected to the said pressure line downstream of the said valve means,
   connecting means mechanically interconnecting the piston-cylinder assembly with the said member whereby to enable the driver to adjust the engine power by varying the pressure in the piston-cylinder assembly by means of the first valve means, and
   second pressure-adjusting valve means in the said pressure line and upstream of the first valve means and responsive to the said control signal and operative to vary the engine power in dependence on the said control signal,
   whereby setting of the first valve means to the minimum engine power setting shuts the said pressure line and substantially prevents the second valve means from affecting the pressure in the piston-cylinder assembly.

2. A system according to claim 1, in which the said member is the injection pump control rack of a diesel engine.

3. A vehicle speed control system, comprising a member whose movement controls the power of the engine of the vehicle, a piston-cylinder assembly, a linkage connecting the piston of the said assembly to the said member, a source of pressure, a driver-operable control valve connected in pressure line between the pressure source and the piston-cylinder assembly whereby opening of the valve increases the pressure in the piston-cylinder assembly and increases the engine power and vice versa, control valve means connected in series in the said pressure line between the pressure source and the driver-operable valve source, and automatic speed control means for adjusting the control valve means in dependence on the error (if any) between desired and actual vehicle speeds so as to tend to reduce the error to zero, whereby movement of the driver-operable valve into its setting corresponding to minimum engine power prevents the control valve means from increasing the engine power from the minimum.

* * * * *